US012166904B1

(12) United States Patent
Freeman et al.

(10) Patent No.: US 12,166,904 B1
(45) Date of Patent: Dec. 10, 2024

(54) HIGH-ASSURANCE PRIVATE CERTIFICATE AUTHORITIES

(71) Applicant: Amazon Technologies, Inc., Reno, NV (US)

(72) Inventors: Trevor Freeman, Sammamish, WA (US); Param Sharma, McLean, VA (US); Todd Cignetti, Ashburn, VA (US)

(73) Assignee: Amazon Technologies, Inc., Reno, NV (US)

( * ) Notice: Subject to any disclaimer, the term of this patent is extended or adjusted under 35 U.S.C. 154(b) by 259 days.

(21) Appl. No.: 17/957,665

(22) Filed: Sep. 30, 2022

(51) Int. Cl.
*H04L 9/32* (2006.01)
*H04L 9/00* (2022.01)

(52) U.S. Cl.
CPC ............ *H04L 9/3263* (2013.01); *H04L 9/321* (2013.01); *H04L 9/50* (2022.05)

(58) Field of Classification Search
CPC .......... H04L 9/321; H04L 9/50; H04L 9/3263
See application file for complete search history.

(56) References Cited

U.S. PATENT DOCUMENTS

| 10,506,104 | B1* | 12/2019 | Shakeri ............. H04M 3/42042 |
| 2019/0363896 | A1* | 11/2019 | Finlow-Bates ........ G06Q 20/36 |
| 2021/0314169 | A1* | 10/2021 | Liu .................. G06Q 20/38215 |
| 2023/0006840 | A1* | 1/2023 | Pettit ..................... H04L 9/3239 |
| 2024/0073041 | A1* | 2/2024 | Alsadah ............... H04L 9/0894 |
| 2024/0193271 | A1* | 6/2024 | Liu ........................ G06F 21/566 |

FOREIGN PATENT DOCUMENTS

WO    WO-2018223125 A1 * 12/2018    ........... H04L 9/0825

* cited by examiner

*Primary Examiner* — Hee Soo Kim
(74) *Attorney, Agent, or Firm* — Hogan Lovells US LLP

(57) ABSTRACT

Approaches presented herein relate to the management of secure secrets, such as digital certificates. When an operation is performed by a certificate authority (CA) with respect to a digital certificate, information for the operation is written to a blockchain (or other distributed and verifiable ledger) in addition to a secure database accessible to the CA. The ability of an external party to access the blockchain and independently verify information about a digital certificate can help to increase a level or assurance in the integrity of the CA, which can be important when an entity wants to act as (or offer) their own private certificate authority. Information in the blockchain can also help to identify "dark" certificates, which may appear valid but were not issued by a CA using a valid and secure process, and thus can be identified by a lack of valid transactions included in the corresponding blockchain.

20 Claims, 8 Drawing Sheets

HIGH-ASSURANCE PRIVATE CERTIFICATE AUTHORITIES

BACKGROUND

In a variety of different networked environments, entities can communicate securely by utilizing secure credentials, such as cryptographic keys and digital certificates, to prove their identity. An entity may be assigned a cryptographic key that can be used to encrypt data or communications, as well as a digital certificate that can be used to prove the validity of that key, which may correspond to the public key portion of an asymmetric key pair allocated to that entity. In order to trust communications secured using such keys and certificates, a recipient of these communications must assume that the certificate issuance process is trustworthy and that the certificate itself is valid and genuine. There are situations, however, where a communication may be signed by what is referred to as a "dark" certificate, where an unauthorized entity was able to generate or sign a certificate outside the trusted certificate allocation process, which resulted in a certificate that was not accounted for by any certificate authority. There are currently no additional checks or mechanisms to quickly and easily determine whether a "valid" dark certificate was actually issued by a certificate authority using a trusted process.

BRIEF DESCRIPTION OF THE DRAWINGS

Various embodiments in accordance with the present disclosure will be described with reference to the drawings, in which.

DETAILED DESCRIPTION

Approaches described and suggested herein relate to the management of secure secrets in a distributed or networked environment. In particular, various embodiments provide for the management of secure tokens or secrets, such as digital certificates (e.g., x.509 certificates used as digital identities used on the Internet for authentication Web services). When such a digital certificate is issued, updated, or revoked by a certificate authority (CA) or other authorized entity, information can be written to a secure database accessible by the CA, and can also be written in parallel as a transaction record to a publicly-verifiable distributed ledger, such as a blockchain. A party to an operation involving a validly issued certificate can then verify the validity of a digital certificate by both contacting the CA and also verifying the corresponding information stored to the ledger for the certificate. This additional verification ability can help to increase the level of assurance in the operation of the CA to ensure the integrity of the certificate management process. Such a process can also help to mitigate known threats to the CA by enabling the CA to detect when alleged operations were performed that were not reflected by an entry in the ledger, and thus were not properly performed by an authorized entity, as well as to identify any irregularities in the ledger that might impact a validity of a certificate or a performance of the certificate management process. Having a record of all transactions in such a ledger can also simplify the audit and accreditation process for a CA, enabling any relying party to independently confirm the provenance of any issued certificate. Such a process can be particularly beneficial when a party wants to act as, or provide, their own private certificate authority, as the process can help to establish trust and verify the integrity of that private certificate authority, whether operated by the party or obtained by the party through a security service.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Figure 1:
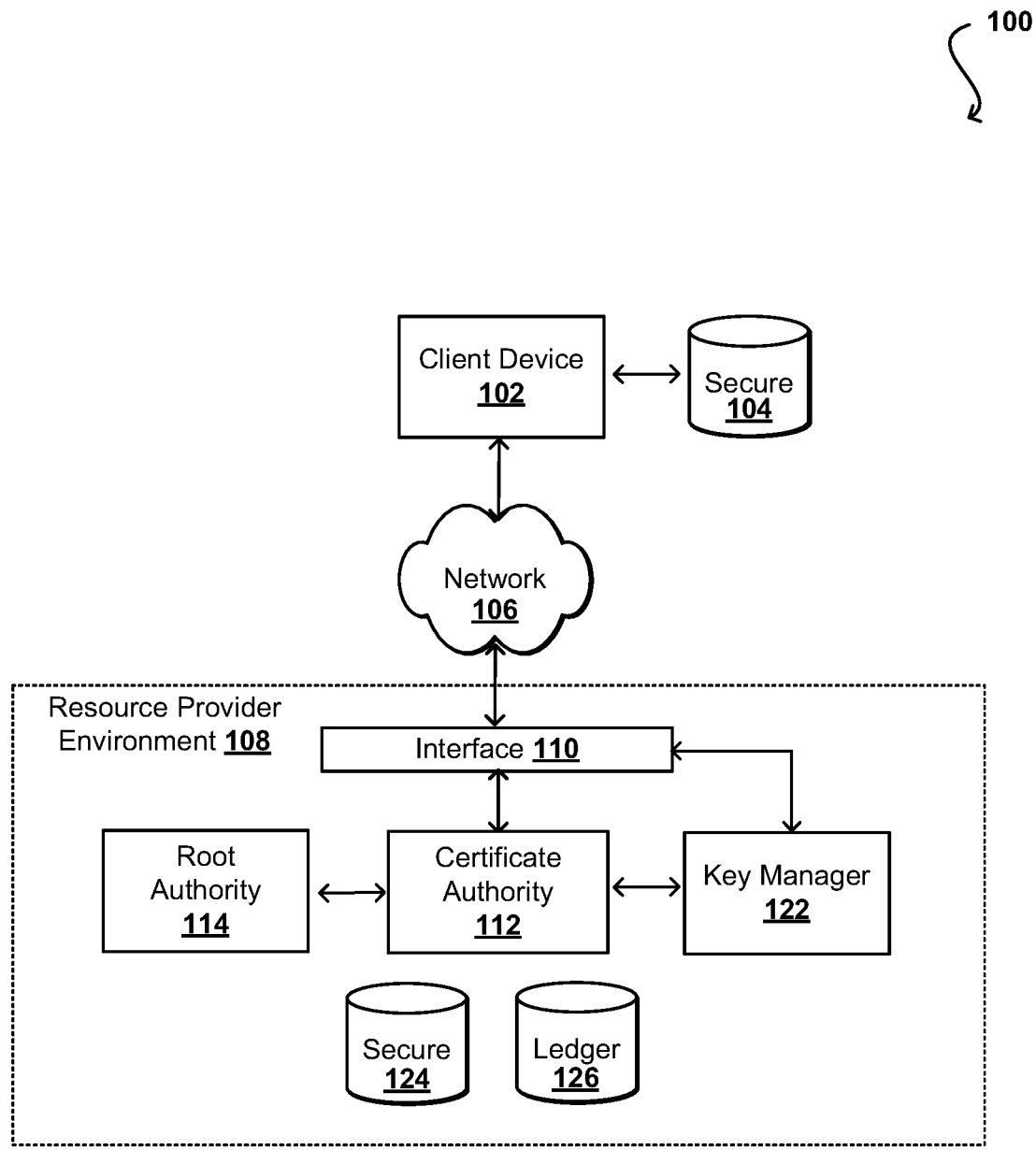
FIG. 1 illustrates example components for providing a certificate authority service that can be used in accordance with various embodiments.

FIG. 1 illustrates an example networked environment 100 that can be used to manage secure credentials, such as encryption keys or digital certificates. In this example, a client device 102 may be instructed to perform one or more secure communications, as may involve communications that comply with a security protocol, such as the transport security layer (TSL) or secure sockets layer (SSL) security protocol. Digital certificates can be provided for these communications in order to authenticate, for example, a source of the communication, where the digital certificate may contain information such as a unique identity, identity of a trusted certificate authority that vouches for the authenticity of the certificate, and a corresponding public encryption key, among other such options. A recipient may confirm the validity of the certificate by contacting a certificate authority. Secure communications can then be sent between these parties for either public or private communications. For example, an entity can provide keys for public SSL websites, where the appropriate domain name service (DNS) name is provided and the entity needs to be able to prove that the entity owns that DNS name.

A security protocol can specify one or more requirements for the communications, in order to ensure that the communications can be regarded as being secure. This can include signing the communications with a digital certificate. As mentioned, an entity (such as a user of the client device 102) can be assigned, or associated with, a cryptographic key or key pair, or other secure token or identifier, and can also be provided with a digital certificate that can be used to prove the validity of that key (or other secret). A certificate can take the form of an electronic file or document that includes information such as a domain for which the certificate was issued, an entity for which the certificate was issued, identification of a certificate authority (CA) that issued the certificate, a digital signature of that CA, an issue date, an expiration date, and a public key that is indicated by this certificate as being valid, among other such information.

In an electrotonic environment 100 such as that illustrated in FIG. 1, the client device may obtain a cryptographic key (or other secure token or identifier) from a key manager 122 or other such source, or may generate or obtain its own key that it can provide to such a key manager 122. This key manager 122 may be part of, or separate from, a resource provider environment 108 in different embodiments. In order to engage in secure communications or activities according to various standards, the client device 102 must first obtain a digital certificate from a trusted certificate authority 112. In this example, the certificate authority 112 is provided using resources of a resource provider environment 108, but a CA external to such an environment can be used as well in various embodiments. In this example, the client device can send a certificate request over at least one network 106 to a recipient endpoint or address of an interface layer 110 of the resource provider environment 108. A component of the interface layer 110, which may contain devices in addition to interfaces, as may include switches, routers, and load balancers, which can then route the request (or information for the request) to the corresponding certificate authority 112. In the example of an asymmetric key pair, the public and private keys may be stored in a secure repository 104 on, or associated with, the client device 102, and the certificate authority 112 and/or key manager 112 can store a copy of the public key in a secure repository 124 in the resource provider environment 108. Upon receiving the request, the certificate authority 112 can validate the entity associated with the client device 102 using supplied credentials, and can generate a digital signature for that entity, including the public key (or other secure token/secret) and a signature of the certificate authority 112. This certificate can serve as confirmation by the CA that the public key contained in the certificate belongs to the entity identified by the certificate. The certificate authority 112 can then provide that certificate to the client device 102 for use in secure operations during a period of validity of the certificate. The certificate authority can store information in a local secure repository 124 for this issued certificate, which can include information for issued certificates as well as revoked or expired certificates.

In some systems, a single tier of certificate authorities may be used, where that certificate authority serves as both a root CA and an issuing CA. In this example, however, a two-tier hierarchy is used where there are both a root certificate authority 114 and a subordinate certificate authority 112. The root CA 114 serves as a trust anchor for issuing digital certificates according to a security structure such as public key infrastructure (PKI). Any entity that trusts the root CA 114 should, in turn, trust any certificates issued by the subordinate CA 112. In various embodiments, the root CA 114 can operate in an offline state while the subordinate CA 112 can operate in an online state. The role separation between the root CA and the subordinate CA can provide for an increased level of security, as the private key of the root CA will be better shielded from compromise by an unauthorized or unintended entity. Such separation can also allow for improved scalability, as there may be multiple CAs that are subordinate to a single root CA 114, which can be useful for a multi-tenant cloud environment, or other cloud or shared resource environment. Such an approach also allows CAs to be located in different geographic regions, as well as to have different levels of security applied. Such an approach can be useful for embodiments where users may be able to operate their own private certificate authorities that are subordinate to a trusted root CA 114.

In one example embodiment, these certificate authorities may comply with a security protocol such as Matter, which is based on PKI. While SSL certificates are often used with websites, Matter-based certificates are often used for smart devices or Internet-of-Things (IoT) devices that send network-based communications as part of their operation. In such an embodiment, the root CA can be required to operate according to a Matter Certificate Practice Statement (CPS). Certificate authorities complying with the Matter protocol can be trusted by all organizations in the Matter community and thus may be considered to be "publicly" trusted CAs. Because these CAs are publicly trusted, they have to operate at a higher level of assurance than a privately-trusted CA, at least as defined in the CPS. Matter root CAs are known as Product Attestation Authorities (PAA). The CPS for PAA is based on best practices when an organization operates using a non-cloud, on-premise CA. In order to make a certificate authority 112 in a resource provider environment 108 or cloud environment available as part of a trusted service, the Matter CPS can be updated to make some of its requirements cloud service friendly. Mechanisms can also be used that help to address the underlying intent of what the CPS lays out within the context of a cloud environment. Matter currently maintains a blockchain ledger where all the trusted PAAs are published.

As illustrated in FIG. 1, an entity (such as a relatively small device vendor) may not want to take on the expense and complexity of operating a dedicated PAA or private CA. Such an entity may instead desire to obtain PAA as a service, such as may be provided using resources of a resource provider environment 108. In such an offering, a resource provider can operate a PAA in accordance with the Matter CPS, and provide enrollment services for these entities, who may be customers of this resource provider. Since an external entity such as a device vendor cannot, generally, send personnel into the data center to perform verification or other operations, the service provider needs to provide sufficient trusted data to enable such verification to be performed remotely. A provider can provide a sufficient combination and variety of services such that the external entity can get the same, or similar, level of assurance as they would have if the CA were a private CA running on their premises under their control. In some embodiments, these services can provide the same types of controls that the external entity would have if they were operating the CA themselves. This may include, for example, providing video data showing which people performed specific actions indicated in the ledger, to ensure that an unauthorized party has not used stolen credentials to perform an action that would otherwise appear to be valid.

Figure 2:
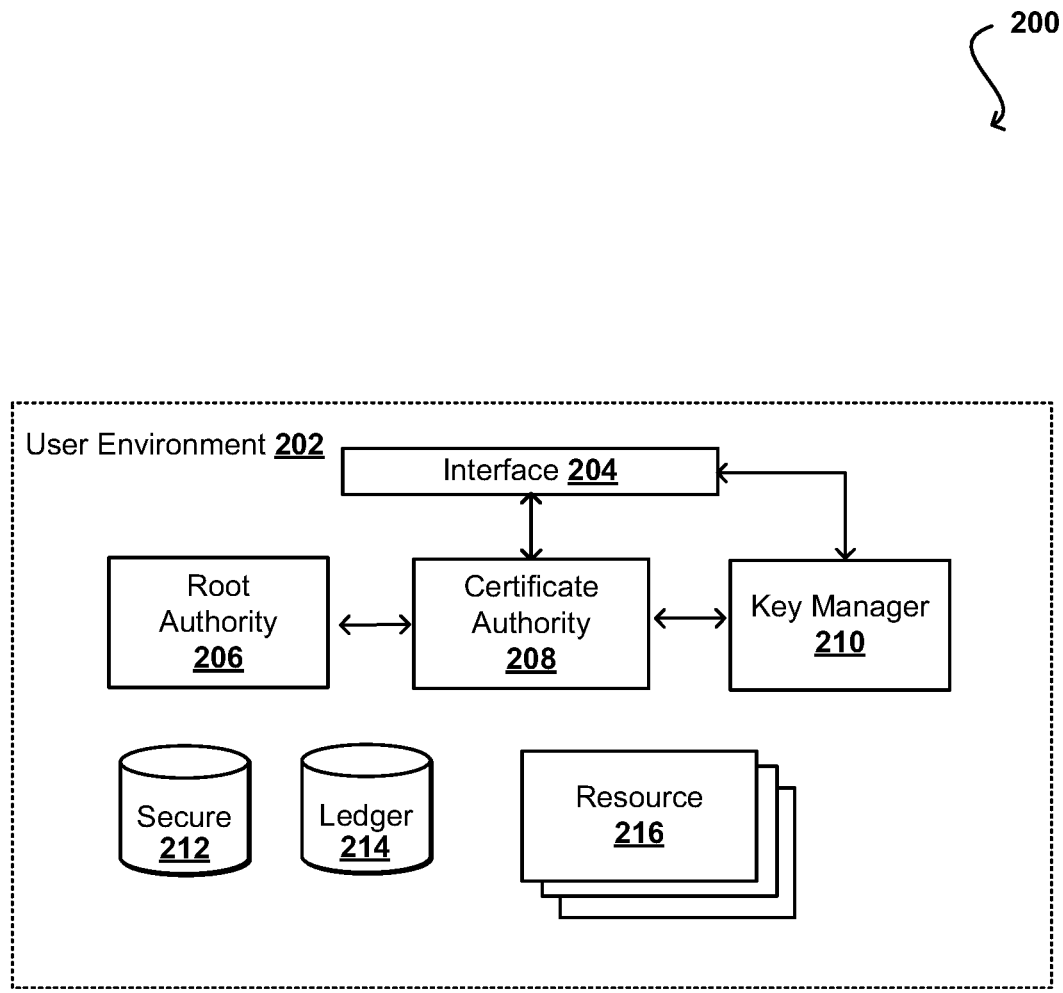
FIG. 2 illustrates example components of a certificate authority system that can be used in accordance with various embodiments.

It might be the case, however, that an entity (such as a major device vendor) may be willing to take on the expense and effort of operating a dedicated PAA for their own use and want to operate their own private CA. FIG. 2 illustrates components of an example system 200 for operating such a private PAA and CA. In this example, the private CA 208 can deliver the tools necessary to enable this entity to operate the PAA via private root authority 206 in accordance with, for example, a Matter CPS. The user (e.g., device vendor) can be responsible for operation of the private PAA, as well as demonstrating its compliance with the CPS. The user environment 202 may contain many different computing resources 216, such as servers, compute instances, virtual machines, client devices, or databases, that may be configured to use at least some amount of certificate based security, whether between resources 216 within this environment 202 or between a resource and an external entity (not illustrated), as may be accessed via an interface layer 204 and at least one network (as illustrated in FIG. 1). The user in this example can perform all functions for functioning as a PAA, including managing encryption keys or secure secrets using a key manager 210 (or token manager, etc.), storing secure data such as keys locally to a secure database 212, and writing certificate transactions to a ledger 214, which is shown to be inside the user environment but can be a distributed ledger that can also be located outside this environment. In this example, the user would operate all these components on premises, or otherwise under the control of that user, rather than obtaining this functionality through one or more network-based services. In some embodiments, there may be variations of these examples, such as where a key manager or root authority may be provided as a service, but a certificate authority may be run in a local environment, among other such options.

In at least one embodiment, additional security can be provided by providing for two-person control (or multi-person control) of various physical and logical controls. Two-person physical control can ensure that two people are required to obtain physical access to the cryptographic hardware used by the PAA, such as where each has a portion of a split signing key, or where two separate signatures are required. In some implementations, a service provider may need to guarantee that two people were present whenever cryptographic hardware is accessed. In some embodiments, two-person logical control can be used to ensure that two people are involved with logical operation of a given CA, including tasks such as creating and renewing the CA, as well as issuing and revoking certificates. The two-person logical control can be performed in such a way as to generate an artifact that can be stored in an audit log to demonstrate that two-person control was used for an operation, as may include a signature from a token that requires two people to operate or two signatures. In at least some embodiments, information for a given transaction can be written to the ledger as well, such as may include identifying information for the number of people who provided for multi-person control for a given action, as well as information such as their location, a mechanism used to provide the control, a security credential or secure identity for each person, a level of authority of each person, and so on. Such information can help to ensure proper multi-person control and assist in the auditing and verification process.

A private CA can also be configured to create a concise record for every critical CA operation, which can then be stored to an audit log. A record may include, for example, proof and identity information for the two people who made the request, the full details of the request, and the outcome including any artifact signed by the CA, such as an issued certificate. While this information could be logged in a conventional way, such logging may mean that the report data can only be verified by auditors. In at least one embodiment, such information can be stored to a publicly verifiable location, such as a distributed ledger. A distributed ledger, such as a blockchain, can provide an immutable and cryptographically-verifiable record of any and all transactions relating to a certificate. A private CA 112, as illustrated in FIG. 1, can be tasked with writing the full details of an operation, such as an event critical operation, to the ledger to provide cryptography-verifiable proof that the transaction took place at a specific time. In at least one embodiment, this distributed ledger 126 can be exposed to the public to enable independent verification of the transaction. Such an approach can also simplify and reduce the cost and complexity of auditing these transactions.

As mentioned, certificates issued by a PAA frequently need to be validated. This can involve validating the signature on a given certificate and requesting revocation information to ensure the issued certificate has not been revoked. Such an approach can be somewhat problematic, however, in that a falsified or "dark" certificate will often be able to pass this validation check. A dark certificate is typically created by someone who has direct access to the CA private key. Such dark certificates can be created totally off the record such that the CA 112 alleged to have issued the certificates will have no knowledge of their existence. Since these dark certificates appear to have been signed by the CA 112, their signature check and would also pass revocation checks. By writing transaction information to a distributed or verifiable ledger, however, the existence (or non-existence) of the certificate in the ledger can be confirmed. This confirmation ability can help to mitigate the threat of dark certificates and provide a high level of assurance that a given certificate is legitimate. In at least one embodiment, such a check can be performed by a private CA 112 using a protocol, such as the Online Status Certificate Protocol (OSCP).

The ability to write information for all transactions for a certificate to a distributed ledger, such as a blockchain, can therefore help to increase a level of assurance around a certificate issuance and management process by building in additional checks and balances that provide greater assurance that a given digital certificate is actually a genuinely issued certificate for an associated entity. The ability to check a blockchain for information about a certificate can help to verify whether the certificate is a valid certificate issued by a specific CA, and not an off-the-record certificate. Such information can also help to verify information about the certificate that is written to the blockchain. A certificate authority 112 can be required to write, and verify, information for any certificate-related transaction or event (or at least a specific set of transactions or events) to this publicly-verifiable, cryptographically protected mechanism. In at least one embodiment, each time a certificate is issued, revoked, or modified, a transaction can be generated in the appropriate ledger to indicate that the transaction occurred and provide the relevant information about the transaction. Even if a certificate is signed, then, it can be determined that a certificate or transaction is not valid if the corresponding information is not present in the appropriate ledger. If such a certificate is identified then that certificate can be revoked such that the certificate is immediately identified as a certificate that is not valid.

In addition to identifying dark or invalid certificates, use of a verifiable ledger can also help to ensure that the appropriate processes are being followed for valid certificates. As each transaction will be written to the ledger with the appropriate time and transaction data, an auditing process can quickly determine whether the appropriate rules or policies are being followed as intended, and that those processed are being performed as intended. An entity relying, or potentially relying, on one or more certificates issued by a given certificate authority can also verify that the appropriate procedure is being followed, which can given even higher assurance in the validity of certificates issued by that CA. Each transaction or other artifact written to such a ledger 126 is thus readily verifiable. Such an approach may be particularly beneficial in a cloud context where there may be multiple CAs issuing certificates, and it can be desirable to ensure that all these CAs are performing as intended and that all certificates issued by these CAs can be readily verified without allowing verification of dark certificates or other certificates that should not be verifiable. A signed certificate will no longer be enough for verification, but the appropriate information for that signed certificate must also be present in the appropriate ledger (e.g., blockchain). This dual requirement can provide higher confidence in the certificates, as well as the process used to generate and manage those certificates.

The storing of transaction information to a verifiable ledger can also help to quickly identify issues with a process being performed by a given CA, or with a specific certificate. For example, a certificate authority may be required to make certain updates or perform certain status checks at specific intervals. Since each of these actions should cause a corresponding transaction to be written to the ledger, any omissions or in accuracies in the transaction data can quickly be identified, whether by an entity associated with the CA or an entity that would like to be able to trust a certificate issued by the CA. An automated auditing process can be performed that analyzes information in the ledger to ensure that the information is in accordance with the appropriate standards, protocols, and best practices. A process can also analyze information for each transaction as it is written to the ledger, to attempt to quicky identify any inaccuracies or potential issues with the problem. Analyzing each transaction entry as it is written, or as a new transaction is identified in the ledger, can also help to quickly identify anyone who is attempting to perform an unauthorized or otherwise insecure action.

In at least some embodiments, each request or instruction to perform an action with respect to a certificate can also undergo at least some amount of pre-processing, such as may be used to ensure that the request or instruction complies with any relevant policies. For example, pre-processing may analyze a request to ensure that the request has the correct format, includes only expected content, comes from an authenticated party or entity, and corresponds to a permitted type of action for that party or entity. There may be various other initial checks on an incoming request performed as well within the scope of the various embodiments. If a request passes all these pre-checks, and is not kicked out or flagged for any reason, then a process can be invoked to perform the requested action or operation. As the operation is being performed, or as a final step in the operation, etc., at least some of this information can be written to the appropriate verifiable ledger as part of a transaction for the relevant certificate. This may include information not only about the CA and the certificate, but also a set of artifacts or data entries indicating why that transaction occurred, such as that the request complied with one or more identified policies, identity information for the requestor, credentials or data provided with the request, and so forth. An artifact as used herein can refer to any data, record, or piece of documentation that can be used as part of an audit process to provide record of an occurrence (e.g., issuance of a certificate), as well as information supporting that occurrence. For a multi-person control example, an artifact may include information useful in verifying which people were involved in a given control action with respect to this transaction, such as the signature from a key used by each person. Artifacts can also contain timestamps from trusted clocks or time sources.

In at least one embodiment, an issued certificate can include a serial number and a thumbprint. The serial number can be a unique identifier for the certificate (such as may be issued using a monotonically increasing numbering process), and the thumbprint can be a cryptographic hash of the certificate, for example, that is computed over the data for the certificate as well as its signature. A thumbprint can serve as a trusted identifier for a certificate when used with applications or operations that are to make trust-based decisions. These identifiers can be used to perform tasks such as revocation checking. In revocation checking, there may be a list of "bad" certificates, or certificates that have expired or are otherwise no longer valid. Processes can be put into place to ensure that no trusted operations are performed using one of these bad certificates. A process such as an online certificate status protocol (OCSP) check can be performed as well, to attempt to locate valid certificates. In such a check, information for a certificate can be provided for use in validating a given certificate. As part of that process, the process can check the appropriate verifiable ledger to ensure that all transaction information for that certificate is valid, accurate, and/or complete, which provides additional assurance that a given certificate is valid and can be trusted. While a revocation list including identifiers for bad certificates can help with assurance, such an approach is reactive and only works once a certificate is added to that list, whereas with an OCSP (or similar) approach the information for a certificate can be verified against the ledger so that a certificate can be validated or invalidated before an action is performed, which enables such a system to be more proactive in identifying bad certificates before they can be used for trusted operations. Because this information can be stored to a publicly-available ledger, this can allow external parties (such as a recipient of a communication secured using a certificate) to verify the certificate as well before relying on that certificate for a trusted operation. In at least some embodiments, an external party can verify information for a certificate using the ledger or blockchain, while a CA can also verify the data in the ledger or blockchain against information stored in a CA database that may not be available to anyone outside the scope of the CA.

In various instances, however, it can be much more computationally expensive to check the blockchain versus checking a bad certificate list or information in a CA database. It may therefore be beneficial, in at least some systems, to not check the blockchain or ledger for each certificate verification. For many distributed ledger, a notification can be provided to specific parties (e.g., subscribers to a blockchain) each time a new transaction is written to the ledger, and data for this notification can be used to update a local cache of the data in the ledger. In this way, a CA can keep an accurate and up-to-date record (allowing for some latency in communicating and storing the information) of what is in the ledger for a given certificate. A CA might check the ledger periodically to ensure that the information is accurate, but can primarily rely on locally-stored information indicating what is in the ledger. This way, the CA can still cross-reference the bad certificate list, the data stored to the CA database, and the information written to the ledger, without having to take on the expense of checking the ledger for each certificate-related operation. To further conserve computational expense, such a ledger-inclusive approach may be used primarily for long-lived security tokens or secrets (or signed code, etc.), rather than tokens with relatively short lifetimes that are only valid for a limited period of time.

Figure 3:
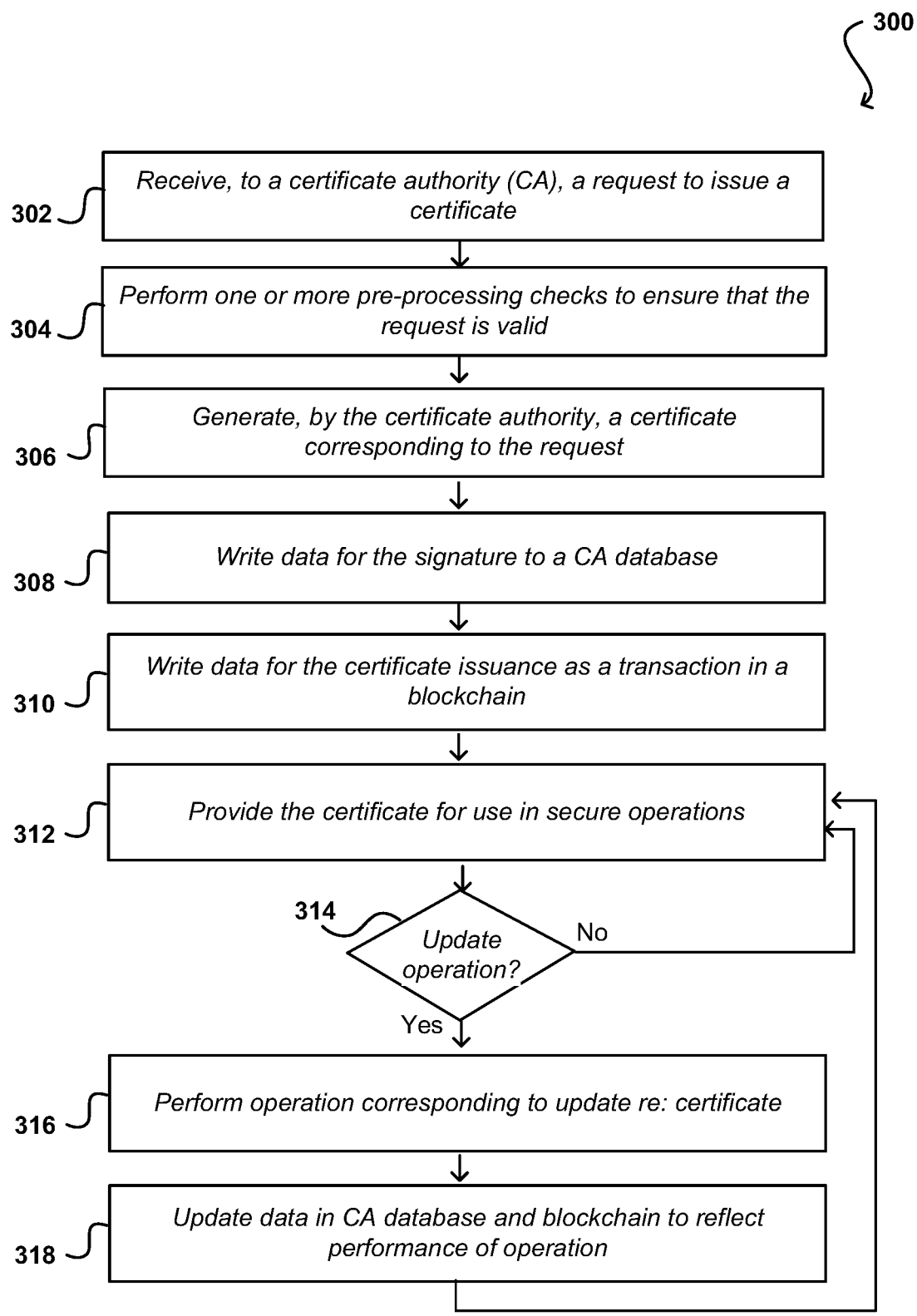
FIG. 3 illustrates an example process for managing a digital certificate, in accordance with various embodiments.

FIG. 3 illustrates an example process 300 for creating and managing a digital certificate that can be performed in accordance with various embodiments. It should be understood that for this and other processes presented herein there may be additional, fewer, or alternative steps performed in similar or alternative orders, or at least partially in parallel, within the scope of the various embodiments unless otherwise specifically stated. Further, although this example process will be discussed with respect to digital certificates, it should be understood that other secrets or security measure may be issued, managed and used with other types of components, applications, services, systems, components, processes, or entities as well within the scope of the various embodiments. In this example, a request can be received 302 to a certificate authority (CA) to issue a digital certificate. The request can include any appropriate information, as may include identifying information (e.g., a unique identifier) for a sender of the request, a public encryption key associated with the sender, and so on. The CA (or at least one system, service, or component in communication with the CA) can perform 304 (or cause to be performed) one or more pre-processing checks to ensure that the request is valid. In addition to authenticating a source of the request, this can include ensuring that the request is well-formed, such as by having the correct format, including the correct content, etc. Once the request is validated, a digital certificate can be generated 306, by the certificate authority (e.g., a subordinate CA to a root CA) that corresponds to the request, and can be used by an authenticated source of the request (or other authorized recipient or party). The certificate can include any appropriate (or required) information, such as may include a unique identifier and public key for an entity associated with the certificate, identifying information for the certificate authority issuing the certificate, and other information as discussed elsewhere herein. As mentioned, other secure tokens or secrets can be issued by other secure authorities as well within the scope of various embodiments.

In this example, information for the generated signature can be written 308 to a secure database associated with the CA, where the CA can store information that can be used to validate the certificate upon request by a third party, such as a recipient of a communication including the digital certificate. In this example, at least some of this information (and potentially other relevant information) can also be written 310 as a transaction record in a blockchain or distributed ledger that is publicly assessable and verifiable. In some embodiments, there may be access restrictions on such a ledger and it may be accessible only to authorized parties or subscribers to that ledger. In this example embodiment, every valid transaction involving this digital certificate that is performed by the CA (or another authorized party or authority in some embodiments) will necessarily be written as a new record to the blockchain, such that the blockchain contains a full and accurate history of transactions (including issuance and revocation actions) for the certificate. The certificate can then be provided 312 for use by the requesting party in secure operations. Once issued, there may be requests or instructions to perform various operations with respect to the certificate that update information for the certificate and thus should be reflected in the blockchain. This may include an operation to modify the expiration date of the certificate or revoke the certificate, among other such options. Since an initial expiration date for a certificate can have been included in the original transaction for the certificate when issued, the expiration of a certificate does not need to be written as a separate transaction to the blockchain in at least some embodiments as that information is already provided in the initial transaction record. If it is determined 314 that an update operation is to be performed (assuming successful validation and/or authentication) then the operation can be performed 316 that involves some type of update with respect to the certificate that is associated with the operation. The data in both the secure CA database and the blockchain can then be updated 318 to reflect performance of the operation and/or updating of the certificate. This process can continue as long as the certificate is valid, has not expired, and has not been revoked, such that any party can verify the state of the certificate using at least the transaction data in the blockchain.

Figure 4:
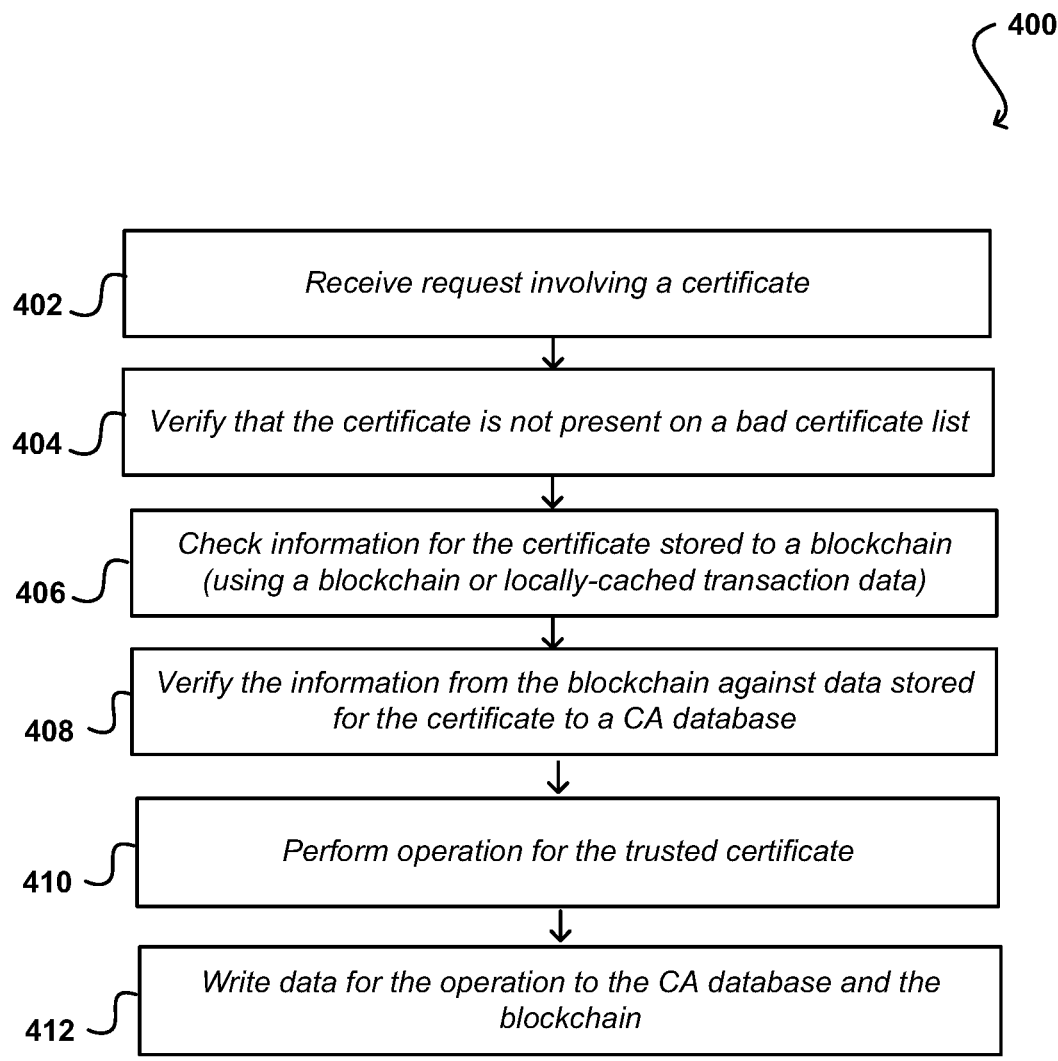
FIG. 4 illustrates an example process for verifying a digital certificate by a certificate authority, in accordance with various embodiments.

FIG. 4 illustrates an example process 400 that a CA (or other such authority) can perform to validate a digital certificate. In this example, the CA can receive 402 a request involving a certificate, such as to validate the certificate for a party to a secure communication involving the certificate. The CA in this example can check a bad (e.g., revoked) certificate list to verify 404 that the certificate is not present on the list, and thus has not been officially revoked or is otherwise not determined to be invalid or unable to be used for secure operations. If a dark certificate or other invalid certificate is determined, the information in the bad certificate list can be updated accordingly and the request can be denied. The CA can also check 406 information for the certificate that is stored to a blockchain, or other verifiable ledger, to check information for any transaction that was performed that involves the certificate. As mentioned, this can include checking the blockchain directly or checking a local cache storing information previously obtained from the blockchain. If the certificate is not located in the appropriate blockchain, then it can be assumed that this is an invalid or dark certificate, such that the request can be denied and the certificate information can be added to the dark certificate list. The certificate can also be identified as being revoked. Assuming the information in the blockchain passes any validation or verification checks, the information from the blockchain can be verified 408 against information stored for the certificate to a secure database associated with the CA, in order to ensure that there are no unexpected discrepancies, omissions, or additions to the blockchain with respect to the CA database. Once the information is validated, the operation for the trusted certificate can be performed 410. Data for this performed operation can then be written to the CA database and as a transaction record in the blockchain with respect to the certificate, at least for certain types of operations that may impact a validity of the certificate or that are otherwise required to be written to the blockchain.

Figure 5:
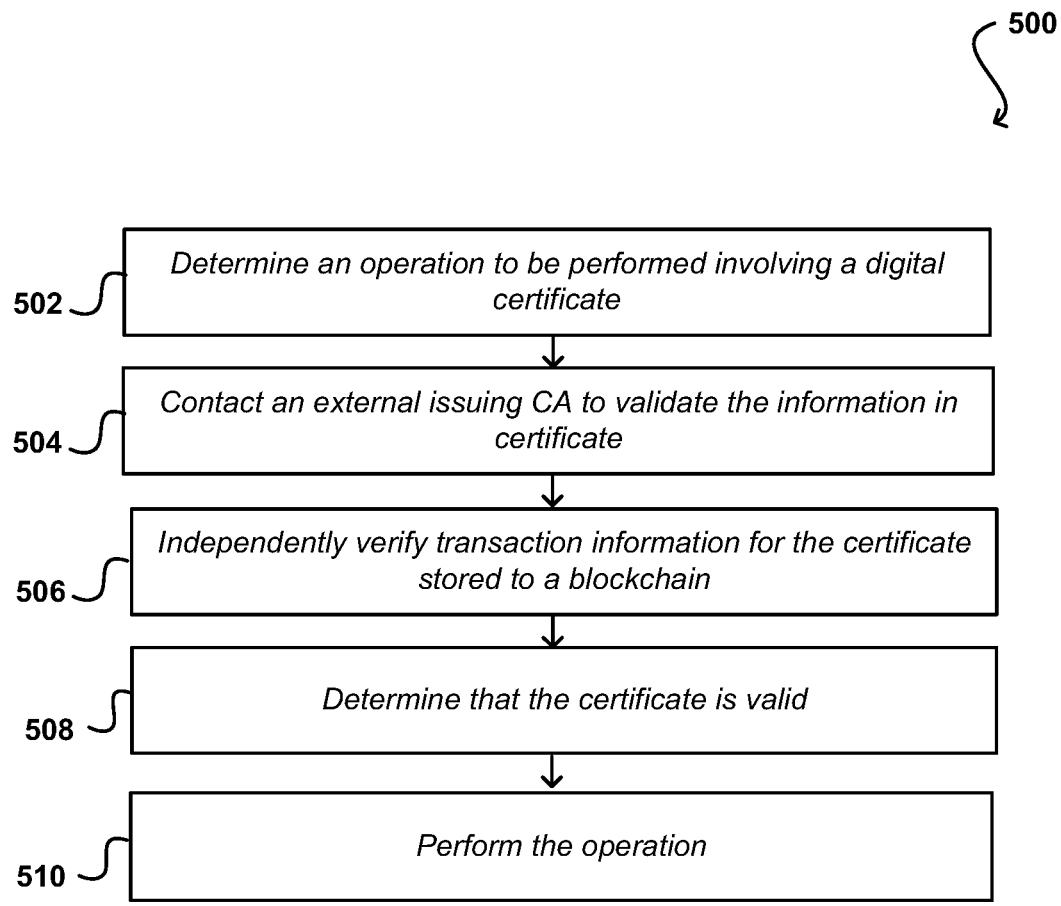
FIG. 5 illustrates an example process for public verification of a digital certificate, in accordance with various embodiments.

FIG. 5 illustrates an example process 500 that a party other than a CA (or other such authority) can perform to validate a digital certificate. In this example, an operation can be determined 502 that is to be performed involving a digital certificate, such as where the certificate is provided to authenticate an identity of a source requesting performance of the operation. The party can contact 504 an external CA that issued the certificate (or other CA, not associated with the party, that is authorized to validate the certificate, such as another subordinate CA to the same root CA). In addition to contacting the CA to obtain validation, the party can independently verify 506 that the certificate is valid and associated with the purported source of the request by checking the transaction information stored to a blockchain associated with the certificate. This can include not only checking the records to make sure that the certificate is associated with the source and has not been revoked, but can also include making sure that there are no unexpected or questionable entries or omissions in the blockchain. Upon checking the blockchain and receiving a valid response from the contacted CA, the party can determine 508 that the certificate is valid, and can perform 510 the associated operation. In the event that the CA indicates that the certificate is valid but the blockchain entries are not trusted, the party can decide not to perform the operation, and in some embodiments may contact the CA regarding the issue so the CA can determine whether to update the blockchain and/or revoke the certificate, among other such options.

Figure 6:
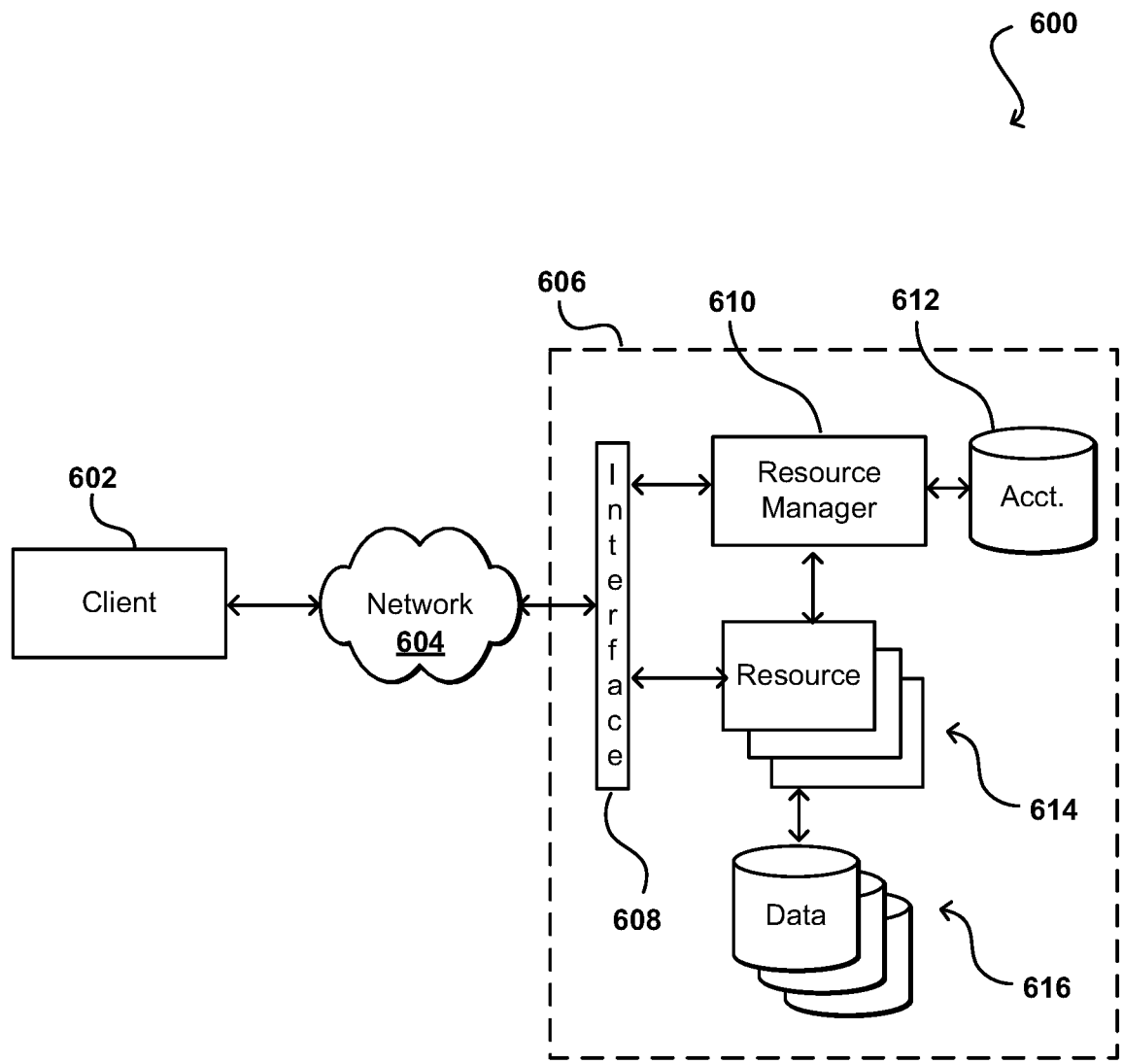
FIG. 6 illustrates an example network-inclusive computing environment in which aspects of various embodiments can be implemented.

FIG. 6 illustrates an example environment 600 in which aspect of various embodiments can be implemented. Such an environment can be used in some embodiments to provide resource capacity for one or more users, or customers of a resource provider, as part of a shared or multi-tenant resource environment. In this example a user is able to utilize a client device 602 to submit requests across at least one network 604 to a multi-tenant resource provider environment 606. This can include an end client that is able to use a certificate for secure communications, where the certificate was obtained using a requestor executing on the end client. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 604 can include any appropriate network, including an intranet, the Internet, a cellular network, a local area network (LAN), or any other such network or combination, and communication over the network can be enabled via wired and/or wireless connections. The resource provider environment 606 can include any appropriate components for receiving requests and returning information or performing actions in response to those requests. As an example, the provider environment might include Web servers and/or application servers for receiving and processing requests, then returning data, Web pages, video, audio, or other such content or information in response to the request. The environment can be secured such that only authorized users have permission to access those resources.

In various embodiments, a provider environment 606 may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 614 of one or more types. These types can include, for example, application servers operable to process instructions provided by a user or database servers operable to process data stored in one or more data stores 616 in response to a user request. As known for such purposes, a user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 614 can submit a request that is received to an interface layer 608 of the provider environment 606. The interface layer can include application programming interfaces (APIs) or other exposed interfaces enabling a user to submit requests to the provider environment. The interface layer 608 in this example can also include other components as well, such as at least one Web server, routing components, load balancers, and the like. When a request to provision a resource is received to the interface layer 608, information for the request can be directed to a resource manager 610 or other such system, service, or component configured to manage user accounts and information, resource provisioning and usage, and other such aspects. A resource manager 610 receiving the request can perform tasks such as to authenticate an identity of the user submitting the request, as well as to determine whether that user has an existing account with the resource provider, where the account data may be stored in at least one data store 612 in the provider environment. A user can provide any of various types of credentials in order to authenticate an identity of the user to the provider. These credentials can include, for example, a username and password pair, biometric data, a digital signature, or other such information. The provider can validate this information against information stored for the user. If a user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identity, specific address, or other such information that can enable the client device 602 to communicate with an allocated resource without having to communicate with the resource manager 610, at least until such time as a relevant aspect of the user account changes, the user is no longer granted access to the resource, or another such aspect changes. In some embodiments, a user can run a host operating system on a physical resource, such as a server, which can provide that user with direct access to hardware and software on that server, providing near full access and control over that resource for at least a determined period of time. Access such as this is sometimes referred to as "bare metal" access as a user provisioned on that resource has access to the physical hardware.

A resource manager 610 (or another such system or service) in this example can also function as a virtual layer of hardware and software components that handles control functions in addition to management actions, as may include provisioning, scaling, replication, etc. The resource manager can utilize dedicated APIs in the interface layer 608, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 608 in at least one embodiment includes a scalable set of user-facing servers that can provide the various APIs and return the appropriate responses based on the API specifications. The interface layer also can include at least one API service layer that in one embodiment consists of stateless, replicated servers which process the externally-facing user APIs. The interface layer can be responsible for Web service front end features such as authenticating users based on credentials, authorizing the user, throttling user requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, users of the control service. The servers of the Web services layer can be stateless and scaled horizontally as known in the art. API servers, as well as the persistent data store, can be spread across multiple data centers in a region, for example, such that the servers are resilient to single data center failures.

Figure 7:
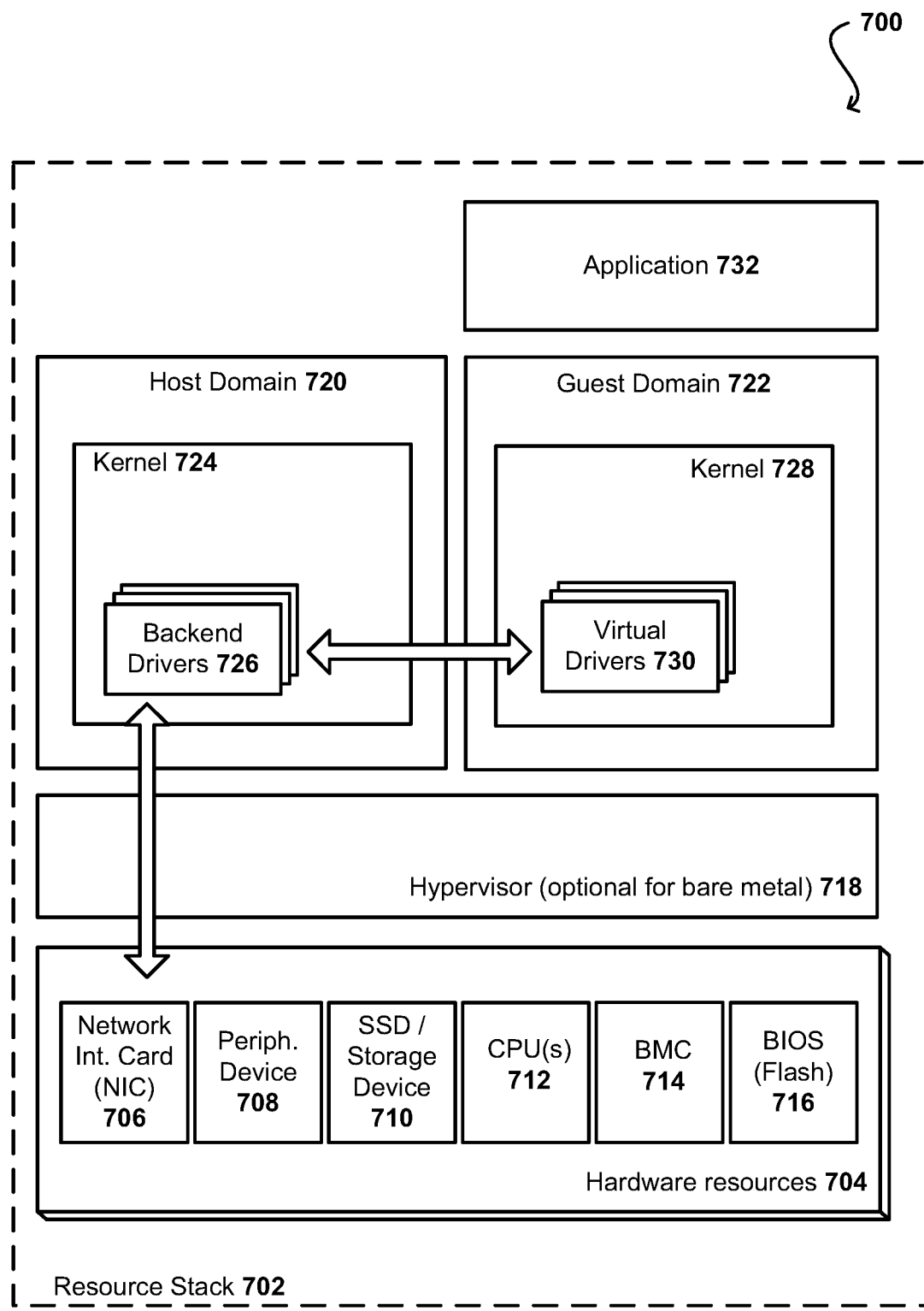
FIG. 7 illustrates example components of a server that can be utilized to perform at least a portion of a transcoding process, in accordance with various embodiments.

FIG. 7 illustrates an example resource stack 702 of a physical resource 700 that can be utilized in accordance with various embodiments. Such a resource stack 702 can be used to provide an allocated environment for a user (or customer of a resource provider) having an operating system provisioned on the resource. In accordance with the illustrated embodiment, the resource stack 702 includes a number of hardware resources 704, such as one or more central processing units (CPUs) 712; solid state drives (SSDs) or other storage devices 710; a network interface card (NIC) 706, one or more peripheral devices (e.g., a graphics processing unit (GPU), etc.) 708, a BIOS implemented in flash memory 716, and a baseboard management controller (BMC) 714, and the like. In some embodiments, the hardware resources 704 reside on a single computing device (e.g. chassis). In other embodiments, the hardware resources can reside on multiple devices, racks, chassis, and the like. Running on top of the hardware resources 704, a virtual resource stack may include a virtualization layer such as a hypervisor 718 for a Xen-based implementation, a host domain 720, and potentially also one or more guest domains 722 capable of executing at least one application 732. The hypervisor 718, if utilized for a virtualized environment, can manage execution of the one or more guest operating systems and allow multiple instances of different operating systems to share the underlying hardware resources 704. Conventionally, hypervisors are installed on server hardware, with the function of running guest operating systems, where the guest operating systems themselves act as servers.

In accordance with an embodiment, a hypervisor 718 can host a number of domains (e.g., virtual machines), such as the host domain 720 and one or more guest domains 722. In one embodiment, the host domain 720 (e.g., the Dom-0) is the first domain created and helps virtualize hardware resources and manage all of the other domains running on the hypervisor 718. For example, the host domain 720 can manage the creating, destroying, migrating, saving, or restoring the one or more guest domains 722 (e.g., the Dom-U). In accordance with various embodiments, the hypervisor 718 can control access to the hardware resources such as the CPU, input/output (I/O) memory, and hypervisor memory.

A guest domain 722 can include one or more virtualized or para-virtualized drivers 730 and the host domain can include one or more backend device drivers 726. When the operating system (OS) kernel 728 in the guest domain 722 wants to invoke an I/O operation, the virtualized driver 730 may perform the operation by way of communicating with the backend device driver 726 in the host domain 720. When the guest driver 730 wants to initiate an I/O operation (e.g., to send out a network packet), a guest kernel component can identify which physical memory buffer contains the packet (or other data) and the guest driver 730 can either copy the memory buffer to a temporary storage location in the kernel for performing I/O or obtain a set of pointers to the memory pages that contain the packet(s). In at least one embodiment, these locations or pointers are provided to the backend driver 726 of the host kernel 724 which can obtain access to the data and communicate it directly to the hardware device, such as the NIC 706 for sending the packet over the network.

It should be noted that the resource stack 702 illustrated in FIG. 7 is only one possible example of a set of resources that is capable of providing a virtualized computing environment and that the various embodiments described herein are not necessarily limited to this particular resource stack. In some embodiments, the guest domain 722 may have substantially native or "bare metal" access to the NIC 706 hardware, for example as provided by device assignment technology based on an IO Memory Management Unit (IO-MMU) device mapping solution like Intel VT-D. In such an implementation, there may be no virtualization layer (e.g., Hypervisor) present. The host domain, or OS, may then be provided by the user, with no guest domains utilized. Other technologies, such Single Root IO Virtualization (SR-IOV), may provide similar "bare metal" functionality to guest domains for only certain functionality of the devices. In general, in various other embodiments, the resource stack may comprise different virtualization strategies, hardware devices, operating systems, kernels, domains, drivers, hypervisors and other resources.

In compute servers, a Board Management Controller (BMC) 714 can maintain a list of events that have occurred in the system, referred to herein as a system event log (SEL). In at least one embodiment, the BMC 714 can receive system event logs from the BIOS 716 on the host processor. The BIOS 716 can provide data for system events over an appropriate interface, such as an I2C interface, to the BMC using an appropriate protocol, such as an SMBus System Interface (SSIF) or KCS interface over LPC. As mentioned, an example of a system event log event from BIOS includes an uncorrectable memory error, indicating a bad RAM stick. In at least some embodiments, system event logs recorded by BMCs on various resources can be used for purposes such as to monitor server health, including triggering manual replacement of parts or instance degrade when SELs from the BIOS indicate failure.

As mentioned, in a virtualized environment the hypervisor 718 can prevent the guest operating system, or guest domain 722, from sending such system event log data to the BMC 714. In the case of bare metal access without such a hypervisor, however, user instances can have the ability to send data for system event that spoof events from the BIOS 716. Such activity could lead to compromised bare metal instances being prematurely degraded due to fake system event data produced by the user OS.

In at least one embodiment, however, there will be portions of the physical resource 700 that will be inaccessible to the user OS. This can include, for example, at least a portion of BIOS memory 716. BIOS memory 716 in at least one embodiment is volatile memory such that any data stored to that memory will be lost in the event of a reboot or power down event. The BIOS may keep at least a portion of host memory unmapped, such that it is not discoverable by a host OS. As mentioned, data such as a secret token can be stored to BIOS memory 716 at boot time, before a user OS is executing on the resource. Once the user OS is executing on the resource, that OS will be prevented from accessing that secret token in BIOS memory 716. In at least one embodiment, this secret token (or other stored secret) can be provided to the BMC 714 when adding system event log events, whereby the BMC 714 can confirm that the event is being sent by the BIOS 716 and not by the user OS.

Figure 8:
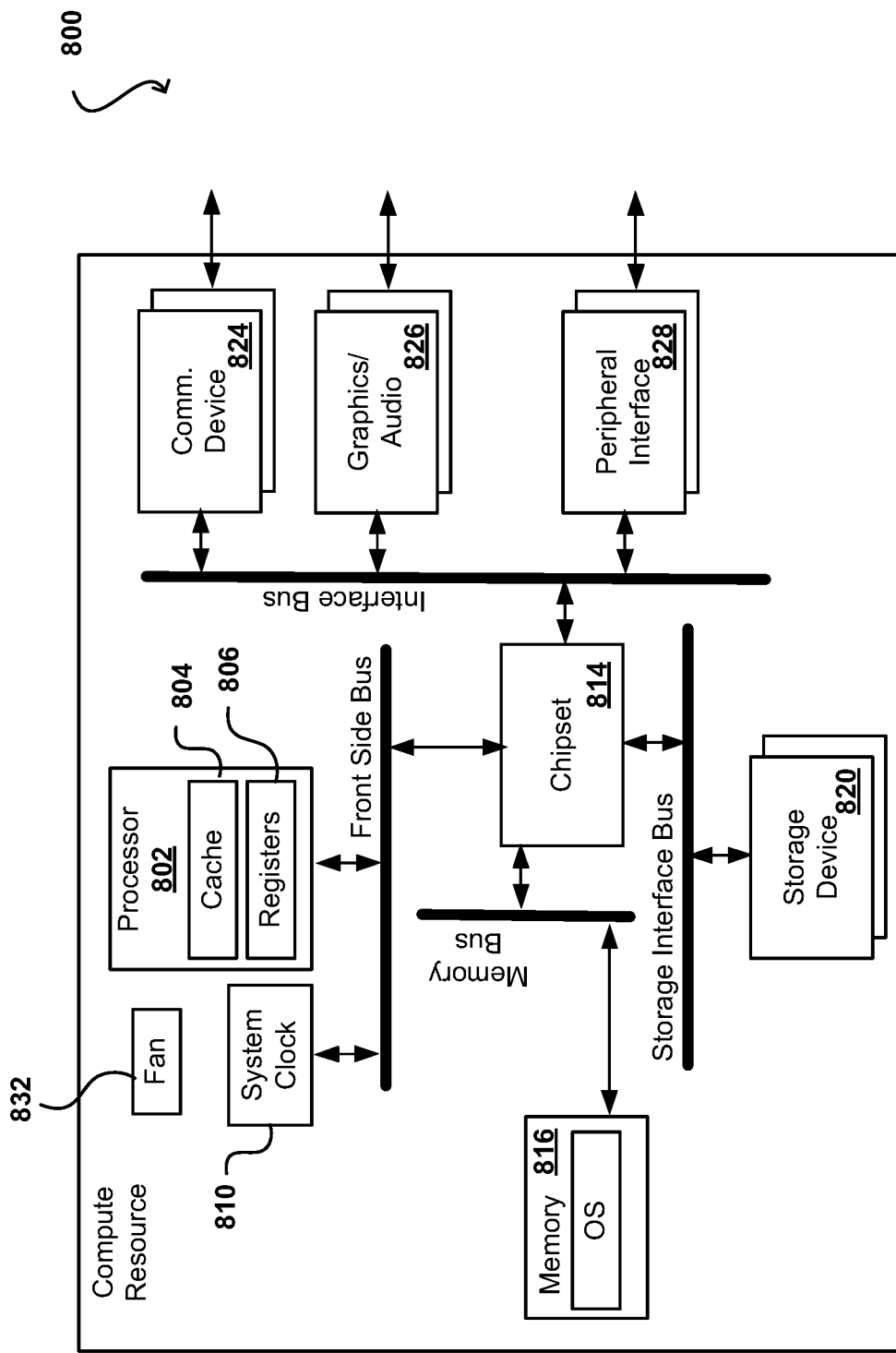
FIG. 8 illustrates example components of a computing device that can be used to implement aspects of various embodiments.

Computing resources, such as servers or personal computers, will generally include at least a set of standard components configured for general purpose operation, although various proprietary components and configurations can be used as well within the scope of the various embodiments. FIG. 8 illustrates components of an example computing resource 800 that can be utilized in accordance with various embodiments. It should be understood that there can be many such compute resources and many such components provided in various arrangements, such as in a local network or across the Internet or "cloud," to provide compute resource capacity as discussed elsewhere herein. The computing resource 800 (e.g., a desktop or network server) will have one or more processors 802, such as central processing units (CPUs), graphics processing units (GPUs), and the like, that are electronically and/or communicatively coupled with various components using various buses, traces, and other such mechanisms. A processor 802 can include memory registers 806 and cache memory 804 for holding instructions, data, and the like. In this example, a chipset 814, which can include a northbridge and southbridge in some embodiments, can work with the various system buses to connect the processor 802 to components such as system memory 816, in the form or physical RAM or ROM, which can include the code for the operating system as well as various other instructions and data utilized for operation of the computing device. The computing device can also contain, or communicate with, one or more storage devices 820, such as hard drives, flash drives, optical storage, and the like, for persisting data and instructions similar, or in addition to, those stored in the processor and memory. The processor 802 can also communicate with various other components via the chipset 814 and an interface bus (or graphics bus, etc.), where those components can include communications devices 824 such as cellular modems or network cards, media components 826, such as graphics cards and audio components, and peripheral interfaces 828 for connecting peripheral devices, such as printers, keyboards, and the like. At least one cooling fan 832 or other such temperature regulating or reduction component can also be included as well, which can be driven by the processor or triggered by various other sensors or components on, or remote from, the device. Various other or alternative components and configurations can be utilized as well as known in the art for computing devices.

At least one processor 802 can obtain data from physical memory 816, such as a dynamic random access memory (DRAM) module, via a coherency fabric in some embodiments. It should be understood that various architectures can be utilized for such a computing device, that may include varying selections, numbers, and arguments of buses and bridges within the scope of the various embodiments. The data in memory may be managed and accessed by a memory controller, such as a DDR controller, through the coherency fabric. The data may be temporarily stored in a processor cache 804 in at least some embodiments. The computing device 800 can also support multiple I/O devices using a set of I/O controllers connected via an I/O bus. There may be I/O controllers to support respective types of I/O devices, such as a universal serial bus (USB) device, data storage (e.g., flash or disk storage), a network card, a peripheral component interconnect express (PCIe) card or interface 828, a communication device 824, a graphics or audio card 826, and a direct memory access (DMA) card, among other such options. In some embodiments, components such as the processor, controllers, and caches can be configured on a single card, board, or chip (i.e., a system-on-chip implementation), while in other embodiments at least some of the components may be located in different locations, etc.

An operating system (OS) running on the processor 802 can help to manage the various devices that may be utilized to provide input to be processed. This can include, for example, utilizing relevant device drivers to enable interaction with various I/O devices, where those devices may relate to data storage, device communications, user interfaces, and the like. The various I/O devices will typically connect via various device ports and communicate with the processor and other device components over one or more buses. There can be specific types of buses that provide for communications according to specific protocols, as may include peripheral component interconnect) PCI or small computer system interface (SCSI) communications, among other such options. Communications can occur using registers associated with the respective ports, including registers such as data-in and data-out registers. Communications can also occur using memory-mapped I/O, where a portion of the address space of a processor is mapped to a specific device, and data is written directly to, and from, that portion of the address space.

Such a device may be used, for example, as a server in a server farm or data warehouse. Server computers often have a need to perform tasks outside the environment of the CPU and main memory (i.e., RAM). For example, the server may need to communicate with external entities (e.g., other servers) or process data using an external processor (e.g., a General Purpose Graphical Processing Unit (GPGPU)). In such cases, the CPU may interface with one or more I/O devices. In some cases, these I/O devices may be special-purpose hardware designed to perform a specific role. For example, an Ethernet network interface controller (NIC) may be implemented as an application specific integrated circuit (ASIC) comprising digital logic operable to send and receive packets.

In an illustrative embodiment, a host computing device is associated with various hardware components, software components and respective configurations that facilitate the execution of I/O requests. One such component is an V/O adapter that inputs and/or outputs data along a communication channel. In one aspect, the I/O adapter device can communicate as a standard bridge component for facilitating access between various physical and emulated components and a communication channel. In another aspect, the I/O adapter device can include embedded microprocessors to allow the I/O adapter device to execute computer executable instructions related to the implementation of management functions or the management of one or more such management functions, or to execute other computer executable instructions related to the implementation of the I/O adapter device. In some embodiments, the I/O adapter device may be implemented using multiple discrete hardware elements, such as multiple cards or other devices. A management controller can be configured in such a way to be electrically isolated from any other component in the host device other than the I/O adapter device. In some embodiments, the I/O adapter device is attached externally to the host device. In some embodiments, the I/O adapter device is internally integrated into the host device. Also in communication with the I/O adapter device may be an external communication port component for establishing communication channels between the host device and one or more network-based services or other network-attached or direct-attached computing devices. Illustratively, the external communication port component can correspond to a network switch, sometimes known as a Top of Rack ("TOR") switch. The I/O adapter device can utilize the external communication port component to maintain communication channels between one or more services and the host device, such as health check services, financial services, and the like.

The I/O adapter device can also be in communication with a Basic Input/Output System (BIOS) component. The BIOS component can include non-transitory executable code, often referred to as firmware, which can be executed by one or more processors and used to cause components of the host device to initialize and identify system devices such as the video display card, keyboard and mouse, hard disk drive, optical disc drive and other hardware. The BIOS component can also include or locate boot loader software that will be utilized to boot the host device. For example, in one embodiment, the BIOS component can include executable code that, when executed by a processor, causes the host device to attempt to locate Preboot Execution Environment (PXE) boot software. Additionally, the BIOS component can include or takes the benefit of a hardware latch that is electrically controlled by the I/O adapter device. The hardware latch can restrict access to one or more aspects of the BIOS component, such controlling modifications or configurations of the executable code maintained in the BIOS component. The BIOS component can be connected to (or in communication with) a number of additional computing device resources components, such as processors, memory, and the like. In one embodiment, such computing device resource components may be physical computing device resources in communication with other components via the communication channel. The communication channel can correspond to one or more communication buses, such as a shared bus (e.g., a front side bus, a memory bus), a point-to-point bus such as a PCI or PCI Express bus, etc., in which the components of the bare metal host device communicate. Other types of communication channels, communication media, communication buses or communication protocols (e.g., the Ethernet communication protocol) may also be utilized. Additionally, in other embodiments, one or more of the computing device resource components may be virtualized hardware components emulated by the host device. In such embodiments, the I/O adapter device can implement a management process in which a host device is configured with physical or emulated hardware components based on a variety of criteria. The computing device resource components may be in communication with the I/O adapter device via the communication channel. In addition, a communication channel may connect a PCI Express device to a CPU via a northbridge or host bridge, among other such options.

In communication with the I/O adapter device via the communication channel may be one or more controller components for managing hard drives or other forms of memory. An example of a controller component can be a SATA hard drive controller. Similar to the BIOS component, the controller components can include or take the benefit of a hardware latch that is electrically controlled by the I/O adapter device. The hardware latch can restrict access to one or more aspects of the controller component. Illustratively, the hardware latches may be controlled together or independently. For example, the I/O adapter device may selectively close a hardware latch for one or more components based on a trust level associated with a particular user. In another example, the I/O adapter device may selectively close a hardware latch for one or more components based on a trust level associated with an author or distributor of the executable code to be executed by the I/O adapter device. In a further example, the I/O adapter device may selectively close a hardware latch for one or more components based on a trust level associated with the component itself. The host device can also include additional components that are in communication with one or more of the illustrative components associated with the host device. Such components can include devices, such as one or more controllers in combination with one or more peripheral devices, such as hard disks or other storage devices. Additionally, the additional components of the host device can include another set of peripheral devices, such as Graphics Processing Units ("GPUs"). The peripheral devices and can also be associated with hardware latches for restricting access to one or more aspects of the component. As mentioned above, in one embodiment, the hardware latches may be controlled together or independently.

As discussed, different approaches can be implemented in various environments in accordance with the described embodiments. As will be appreciated, although a network- or Web-based environment is used for purposes of explanation in several examples presented herein, different environments may be used, as appropriate, to implement various embodiments. Such a system can include at least one electronic client device, which can include any appropriate device operable to send and receive requests, messages or information over an appropriate network and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server for receiving requests and serving content in response thereto, although for other networks, an alternative device serving a similar purpose could be used, as would be apparent to one of ordinary skill in the art.

The illustrative environment includes at least one application server and a data store. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device and the application server, can be handled by the Web server. It should be understood that the Web and application servers are not required and are merely example components, as structured code discussed herein can be executed on any appropriate device or host machine as discussed elsewhere herein.

The data store can include several separate data tables, databases or other data storage mechanisms and media for storing data relating to a particular aspect. For example, the data store illustrated includes mechanisms for storing content (e.g., production data) and user information, which can be used to serve content for the production side. The data store is also shown to include a mechanism for storing log or session data. It should be understood that there can be many other aspects that may need to be stored in the data store, such as page image information and access rights information, which can be stored in any of the above listed mechanisms as appropriate or in additional mechanisms in the data store. The data store is operable, through logic associated therewith, to receive instructions from the application server and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated. Thus, the depiction of the systems herein should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
   receiving, to a certificate authority, a request to issue a digital certificate on behalf of a user;
   authenticating an identity of the user and a validity of a public key associated with the user;
   issuing, by the certificate authority, a digital certificate for use by the user in performing one or more secure operations;
   storing first information for the issuing of the digital certificate to a secure database accessible by the certificate authority; and
   writing second information for the issuing of the digital certificate as a transaction record to a blockchain, wherein a party to a communication involving the digital certificate is able to validate information in the digital certificate and independently verify that the information is also contained in the transaction record stored to the blockchain.

2. The computer-implemented method of claim 1, further comprising:
   receiving, to the certificate authority, a valid request to perform an operation with respect to the digital certificate;
   performing, by the certificate authority, the operation with respect to the digital certificate; and
   updating the secure database and the blockchain to reflect the performing of the operation.

3. The computer-implemented method of claim 1, further comprising:
   receiving, to the certificate authority, a request to validate the digital certificate;
   verifying, by the certificate authority, that the digital certificate is valid according to current information for the digital certificate stored to both the secure database and the blockchain; and
   providing a response indicating that the digital certificate is valid.

4. The computer-implemented method of claim 1, wherein the current information stored to the blockchain for the digital certificate is able to be determined by accessing the blockchain, or by accessing one or more transaction records stored to a local cache that were obtained by previously accessing the blockchain or receiving transaction information for an update to the blockchain.

5. The computer-implemented method of claim 1, wherein the certificate authority is provided for operation as a service subordinate to a trusted root certificate authority.

6. A method, comprising:
   performing, by a certificate authority, an operation with respect to a digital certificate;
   storing information for the digital certificate, resulting from the operation, to a secure database accessible to the certificate authority; and
   writing a transaction record, corresponding to the performing of the operation, to a verifiable ledger associated with the digital certificate, wherein a validity of the digital certificate is able to be performed using the information stored to the secure database and the transaction record written to the verifiable ledger.

7. The method of claim 6, further comprising:
   causing the certificate authority to write an additional transaction record to the verifiable ledger for every operation, of at least a set of critical operations, performed with respect to the digital certificate.

8. The method of claim 7, wherein the verifiable ledger is a blockchain, and wherein a party to a communication signed using the digital certificate is able to access the transaction record and any additional transaction record in the blockchain to determine the validity of the digital certificate.

9. The method of claim 6, further comprising:
   receiving, to the certificate authority, a request to validate the digital certificate;
   verifying, by the certificate authority, that the digital certificate is valid according to current information for the digital certificate stored to both the secure database and the verifiable ledger; and
   providing a response indicating that the digital certificate is valid.

10. The method of claim 9, wherein the current information stored to the verifiable ledger for the digital certificate is able to be determined by accessing the verifiable ledger, or by accessing transaction records stored to a local cache that were obtained by previously accessing the verifiable ledger or receiving transaction information for an update to the verifiable ledger.

11. The method of claim 6, further comprising:
verifying that the digital certificate is not identified in a bad certificate list or a revoked certificate list before verifying that the digital certificate is valid.

12. The method of claim 6, further comprising:
auditing a process used by the certificate authority to perform the operation by analyzing all transaction records stored for the digital certificate to the distributed ledger.

13. The method of claim 6, wherein the transaction record includes identifying information for the operation, authentication information for any entity involved in performing the operation, a result of the operation, and a time of the performing of the operation.

14. The method of claim 6, wherein the certificate authority is provided for operation as a service subordinate to a trusted root certificate authority.

15. The method of claim 6, wherein the digital certificate includes a valid public key for a party to whom the digital certificate is issued, a unique identifier for the party, and identifying information for the certificate authority.

16. A system, comprising:
a processor; and
memory including instructions that, when executed by the processor, cause the system to:
perform a trusted operation with respect to a digital certificate;
store information for the digital certificate, resulting from the trusted operation, to a secure database; and
write a transaction record, corresponding to the performing of the trusted operation, to a verifiable ledger associated with the digital certificate, wherein a validity of the digital certificate is able to be performed using the information stored to the secure database and the transaction record written to the verifiable ledger.

17. The system of claim 16, wherein the instructions, when executed by the processor, further cause the system to:
write an additional transaction record to the verifiable ledger for every operation, of at least a set of critical operations, performed with respect to the digital certificate.

18. The system of claim 17, wherein the verifiable ledger is a blockchain, and wherein a party to a communication signed using the digital certificate is able to access the transaction record and any additional transaction record in the blockchain to determine the validity of the digital certificate.

19. The system of claim 16, wherein the instructions, when executed by the processor, further cause the system to:
receive, to a certificate authority having issued the digital certificate, a request to validate the digital certificate;
verify, by the certificate authority, that the digital certificate is valid according to current information for the digital certificate stored to both the secure database and the verifiable ledger; and
provide a response indicating that the digital certificate is valid.

20. The system of claim 19, wherein the current information stored to the verifiable ledger for the digital certificate is able to be determined by accessing the verifiable ledger, or by accessing transaction records stored to a local cache that were obtained by previously accessing the verifiable ledger or receiving transaction information for an update to the verifiable ledger.

\* \* \* \* \*